(12) United States Patent
Nair

(10) Patent No.: US 11,070,548 B2
(45) Date of Patent: Jul. 20, 2021

(54) TOKENIZED ONLINE APPLICATION SESSIONS

(71) Applicant: PAYPAL, INC., San Jose, CA (US)

(72) Inventor: Rahul Nair, Austin, TX (US)

(73) Assignee: PAYPAL, INC., San Jose, CA (US)

(*) Notice: Subject to any disclaimer, the term of this patent is extended or adjusted under 35 U.S.C. 154(b) by 195 days.

(21) Appl. No.: 16/230,051

(22) Filed: Dec. 21, 2018

(65) Prior Publication Data
US 2020/0204542 A1 Jun. 25, 2020

(51) Int. Cl.
*H04L 29/06* (2006.01)

(52) U.S. Cl.
CPC .................. *H04L 63/0853* (2013.01)

(58) Field of Classification Search
CPC combination set(s) only.
See application file for complete search history.

(56) References Cited

U.S. PATENT DOCUMENTS

| | | | |
|---|---|---|---|
| 7,340,525 B1* | 3/2008 | Bhatia | H04L 63/0815 709/229 |
| 7,823,192 B1* | 10/2010 | Fultz | G06F 21/33 726/7 |
| 8,423,651 B1* | 4/2013 | Grieve | G06F 16/904 709/227 |
| 9,646,101 B1* | 5/2017 | Wu | G06K 19/06037 |
| 9,760,704 B2* | 9/2017 | Sherkin | G06F 21/34 |
| 10,270,753 B2* | 4/2019 | Khylkouskaya | H04L 9/0891 |
| 10,678,527 B2* | 6/2020 | Oh | G06F 21/57 |
| 2002/0095607 A1* | 7/2002 | Lin-Hendel | G06F 21/55 726/24 |
| 2003/0158889 A1* | 8/2003 | Massarani | H04L 29/08846 709/203 |
| 2003/0196087 A1* | 10/2003 | Stringer | G06F 21/6209 713/171 |
| 2006/0287992 A1* | 12/2006 | Fischer | G06F 16/986 |
| 2008/0046983 A1* | 2/2008 | Lester | H04L 63/08 726/5 |
| 2010/0161973 A1 | 6/2010 | Chin et al. | |
| 2010/0199089 A1 | 8/2010 | Vysogorets et al. | |
| 2010/0306547 A1* | 12/2010 | Fallows | G06F 21/31 713/178 |

(Continued)

OTHER PUBLICATIONS

Alexandre Alapetite, "Dynamic 2D-barcodes for multi-device Web session migration including mobile phones", DOI 10.1007/s00779-009-0228-5, Springer-Verlag. (Year: 2009).*

(Continued)

*Primary Examiner* — Piotr Poltorak
(74) *Attorney, Agent, or Firm* — Haynes and Boone, LLP

(57) ABSTRACT

A method includes receiving, by a token provider server, a first request for a first token that is associated with first information from a first application. The first request for the first token is part of an application session between a plurality of applications that includes the first application. The token provider server provides the first token to the first application. The token provider server receives the first token from a second application of the plurality of applications. The token provider server provides first information associated with the first token to the second application. The first information enables an action to be performed by the second application based on the first information.

17 Claims, 9 Drawing Sheets

(56) References Cited

U.S. PATENT DOCUMENTS

| | | | |
|---|---|---|---|
| 2010/0306668 A1* | 12/2010 | Williams, III | H04L 9/3226 715/741 |
| 2011/0099384 A1 | 4/2011 | Grange et al. | |
| 2012/0131660 A1* | 5/2012 | Dalzell | G06F 21/335 726/9 |
| 2012/0173610 A1* | 7/2012 | Bleau | H04L 67/26 709/203 |
| 2012/0198531 A1* | 8/2012 | Ort | H04W 12/06 726/7 |
| 2012/0291114 A1* | 11/2012 | Poliashenko | H04L 9/321 726/8 |
| 2013/0086669 A1* | 4/2013 | Sondhi | H04W 12/0608 726/8 |
| 2013/0145172 A1* | 6/2013 | Shablygin | G06F 21/33 713/185 |
| 2013/0145173 A1 | 6/2013 | Shablygin et al. | |
| 2014/0068779 A1* | 3/2014 | Tan | G06F 21/6218 726/26 |
| 2014/0075513 A1* | 3/2014 | Trammel | H04L 63/0876 726/4 |
| 2015/0150111 A1* | 5/2015 | Friedmann | H04W 12/0609 726/9 |
| 2015/0358319 A1* | 12/2015 | Taveau | G06F 21/34 705/44 |
| 2015/0363581 A1* | 12/2015 | Ranadive | G06F 21/34 726/19 |
| 2016/0065584 A1* | 3/2016 | Du | H04L 63/102 726/4 |
| 2017/0111351 A1* | 4/2017 | Grajek | H04L 63/0853 |
| 2017/0142111 A1* | 5/2017 | Ezell | H04L 67/02 |
| 2017/0277867 A1* | 9/2017 | Rangaraj | G06F 21/73 |
| 2017/0357965 A1* | 12/2017 | Knopp | G06Q 20/385 |
| 2018/0268407 A1* | 9/2018 | Voldman | G06Q 20/385 |
| 2019/0197537 A1* | 6/2019 | Desai | G06Q 20/227 |
| 2020/0145421 A1* | 5/2020 | Tin | H04L 9/0618 |

OTHER PUBLICATIONS

PCT International Search Report issued in PCT/US2019/68148, 12 pages.

* cited by examiner

Which cross street is closest to your address on 211 Main St. ?

○ 135TH ST
○ CARNATION CT
○ EGRET ST
○ KING AVE
○ COBBLESTONES AVE
○ LEMONS AVE

FIG. 6

TOKENIZED ONLINE APPLICATION SESSIONS

BACKGROUND

Field of the Invention

The present disclosure generally relates to online or web applications and, more specifically, to techniques for tokenization of an application session between two or more such applications.

Related Art

Often, when completing a task on a first application/website, a user needs to interact with or requests to intact with a second application/website to complete the task. For example, a user may use a search engine application that is integrated with a second application's support database to provide responses to queries related to support at the second application. In other examples, payment service provider applications may be linked with merchant applications, bank applications may be linked with the payment service provider application, and authentication applications (e.g., knowledge-based authentication (KBA)) may be linked with one or more of the other applications. As such, some tasks performed by the user require that the applications pass information between the applications to complete the task and/or cause the user to be redirected to the application that is needed to complete a portion of the task at hand. Some of this information is sensitive information such as user authentication information, user identifying information, account information, and funding source information. Also, an application may need to know what was completed at the other applications in portions of the task that did not involve the application.

BRIEF DESCRIPTION OF THE FIGURES

FIG. 6 is an illustration of an example GUI illustrating a knowledge-based authentication (KBA) challenge, according to one embodiment.

Figure 1:
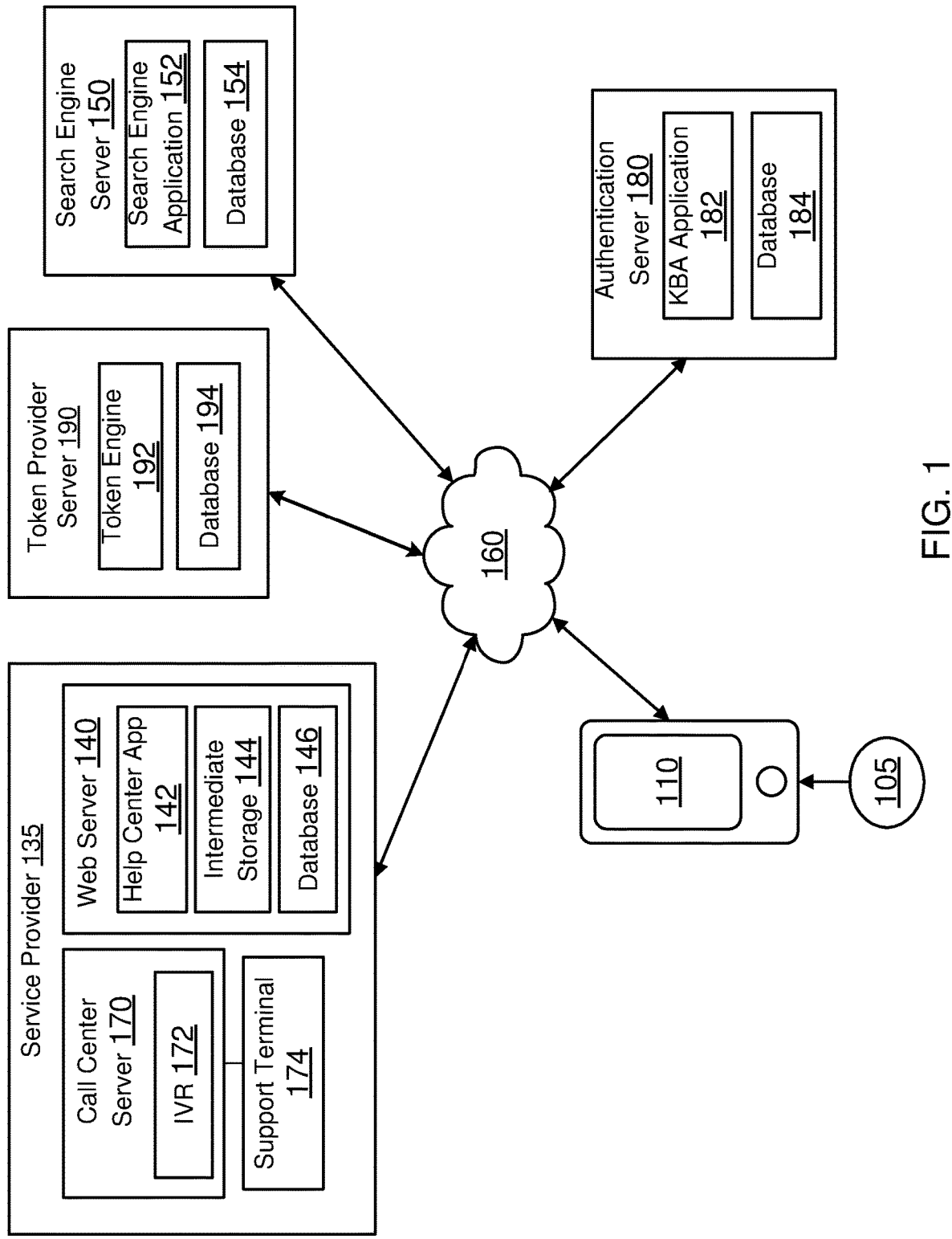
FIG. 1 is block diagram of a networked system suitable for use with tokenized application sessions according to an embodiment.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

Various embodiments provide for systems and methods that tokenize an application session between at least two applications. Existing tokenization frameworks allow for only a single instance point to point interaction between web entities/applications. There is no framework that facilitates an application session that is to be protected/secured to be executed where each session step is an interaction between two web entities/applications on Internet. In various embodiments of the present disclosure, each application session flow of the application session, which is an interaction between two entities during the user's application session, is protected using tokenization where the first application retrieves a token issued by a token provider/vault. The token itself is associated with information at the token provider. The first application then provides the token to the second application. The second application presents the token to the token provider and exchanges it for the information associated with the token. The token provider maintains the secure information mapped to the token. The owner of the overall application session will be offered a master token upon session initiation or at any time during the application session. At end of the session or as part of last step, the session owning application uses the master token to retrieve all session details from token provider/vault that is mapped to the various tokens of the session.

In an example application session, a user may be logged into an online account, such as a search engine user account associated with a search engine. The search engine and a service provider may have an established relationship where they have agreed to share some account information. Accordingly, a user who is logged into the search engine account may then access service provider online help and authentication via a graphical user interface (GUI) provided by the search engine. For instance, the user may type in "how do I add a bank account to my service provider account." The search engine may recognize the relationship between the service provider and the search engine, and in response, send a request to a token provider to tokenize information related to the search engine user account and the token is retrieved by the search engine from the token provider that is mapped/associated with the search engine account information and the service provider. The service provider presents the token to the token provider to retrieve the search engine account information and determines a service provider account by searching a database of service provider user accounts linked to search engine user accounts.

The service provider may determine the intent of the request and determine that further authentication is needed before account information is changed. The service provider may provide the token back to the search engine with instructions to perform a step-up authentication. The search engine may tokenize the user information associated with the search engine user account with the token provider and provide a token mapped to the user information to an authentication server that may provide, for example, a step-up authentication challenge such as a knowledge-based authentication (KBA) challenge provided by a KBA application. The KBA application may provide the token to the token provider to retrieve the user information. The KBA application may provide a KBA security challenge to the search engine such that the search engine presents the KBA security challenge to the user interface. The user may then respond to the KBA security challenge to authenticate herself. The search engine may tokenize the customer's response to the security challenge with the token provider and provides the token to KBA application. The KBA application presents the token to the token provider and gets back the user response to the KBA security challenge. The KBA application processes the user response to the KBA security challenge. The KBA application stores a result of the KBA security challenge as pass, fail, or abandoned against the token and the result of the authentication is provided back to the service provider via a token, which stores the result in intermediate storage. In various embodiments, the token provider may provide a master token that is associated with each token during the application session to the service provider or the owner of the application session such that the service provider may use the master token to retrieve the information that is associated with each token which is also associated with the master token. The service provider may use the result of the authentication to allow the user to now update account information or provide the authentication to an IVR system of the service provider such that the IVR system may use the authentication so that the IVR does not have to obtain the authentication for the KBA security challenge again. A similar technique to that described above may be provided for a user who is logged in to a social media account instead of a search engine that may be linked to a service provider account as well or any other application session that communicates information between more than one application.

FIG. 1 is a block diagram of a networked system suitable for implementing an application session that is tokenized according to an embodiment. Networked system 100 may comprise or implement a plurality of servers and/or software components that operate to perform various payment transactions or processes. Exemplary servers may include, for example, stand-alone and enterprise-class servers operating a server OS such as a MICROSOFT® OS, a UNIX® OS, a LINUX® OS, or other suitable server-based OS. It can be appreciated that the servers illustrated in FIG. 1 may be deployed in other ways and that the operations performed and/or the services provided by such servers may be combined or separated for a given implementation and may be performed by a greater number or fewer number of servers. One or more servers may be operated and/or maintained by the same or different entities.

The networked system 100 may include a user device 110, a service provider 135 that provides a web server 140 and a call center server 170, a search engine server 150, an authentication server 180, and a token provider server 190 in communication over a network 160. The network 160 may be implemented as a single network or a combination of multiple networks. For example, in various embodiments, the network 160 may include the Internet or one or more intranets, landline networks, wireless networks, and/or other appropriate types of networks.

The user device 110, the web server 140, the search engine server 150, the call center server 170, the authentication server 180, and the token provider server 190 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 100, and/or accessible over the network 160.

The user device 110 may be implemented using any appropriate hardware and software configured for wired and/or wireless communication over network 160. For example, in one embodiment, the user device 110 may be implemented as a personal computer (PC), a tablet, such as an iPad™ from Apple™, a smart watch, a smart phone, a smart phone with additional hardware such as NFC chips, BLE hardware etc., wearable devices with similar hardware configurations such as a gaming device, a virtual reality headset, that talk to a smart phone with unique hardware configurations and running appropriate software, laptop computer, and/or other types of computing devices capable of transmitting and/or receiving data.

The user device 110 may employ a transceiver to communicate with the network 160 and the web server 140, the search engine server 150, the call center server 170, the authentication server 180, and/or the token provider server 190. The user device 110 may communicate with the web server 140, the search engine server 150, the call center server 170, the authentication server 180, and/or the token provider server 190 either via network 160 or via other means (e.g., directly by Bluetooth or NFC).

The user device 110 may include a web browser or an application which may be used, for example, to provide a convenient interface to permit a user 105 to browse information available over network 160. For example, in one embodiment, the user device 110 may include a web browser configured to view information available over the Internet, such as a user account for online shopping and/or merchant sites for viewing and purchasing goods and services. In this example, the user device 110 may be used by the user 105 to access a help center application 142, a search engine application 152, and/or any other application user interface that would be apparent to one of skill in the art over the network 160 and using either a web browser or other application installed thereon.

The user device 110 also may include other applications to perform functions, such as email, texting, voice and IM applications that allow the user 105 to send and receive emails, calls, and texts through the network 160, as well as applications that enable the user 105 to communicate, transfer information, and make payments.

Any of the web server 140, the search engine server 150, the call center server 170, the authentication server 180, and/or the token provider server 190 may be implemented using any appropriate hardware and software. In one example, the web server 140, the search engine server 150, the call center server 170, the authentication server 180, and/or the token provider server 190 may include one or more commodity servers running Linux or another operating system. Additionally or alternatively, the web server 140, the search engine server 150, the call center server 170, the authentication server 180, and/or the token provider server 190 may include software servers running on any appropriate hardware, such as a laptop computer, a desktop computer, a server in a rack, a tablet computer, or the like. The help center application 142, a token engine 192, the search engine application 152, an IVR application 172, and a KBA application 182 may be implemented as programs running on operating systems at their various respective servers. It should also be noted that while the web server 140, the search engine server 150, the call center server 170, the authentication server 180, and/or the token provider server 190 is illustrated in this example as a single box, servers may be implemented by themselves or as groups of servers or as virtual servers.

The web server 140 may be maintained, for example, by an entity that provides accounts for consumers. For example, the web server 140 may be maintained by a service provider. For example, the web server 140 may be provided by PAYPAL®, Inc. of San Jose, Calif., USA. However, in other embodiments, the web server 140 may be maintained by or include a credit provider, payment services provider, financial data provider, an entity holding health records, and/or other service provider that would be apparent to one of skill in the art in possession of the present disclosure. The various examples that follow are directed toward a scenario where the web server 140 is associated with a service provider; however, it is understood that the concepts described herein apply equally well to any service provider that provides an application.

The web server 140 includes the help center application 142, an intermediate storage 144, and a database 146. In one embodiment, the user 105 may interact with the help center application 142 through a browser or other application over network 160 to access sensitive account information using a GUI. For instance, the help center application 142 may include a website that is presented externally over the network 160 to a browser or other application at the user device 110 using HTTP or other appropriate protocols. The user 105 may access the help center application 142 for help in accessing secure account information (e.g., requesting a refund, adding a bank account to a service provider account, deleting an account from a service provider account, making a payment, and the like).

The intermediate storage 144 may be associated with the web server 140 or may be implemented at a different server (not shown). In this example, the intermediate storage 144 may include one or a plurality of storage devices used to facilitate the authorization techniques described herein. For instance, the examples described below include storing account number, user intent, method of challenge, outcome of a challenge, and other information so that the call center server 170 may access such information from the intermediate storage 144 to confirm that a user has been authenticated.

In this example, the database 146 may be associated with the web server 140 or may be implemented at a different server (not shown). In this example, the database 146 may include any helpful information regarding users and their accounts. For instance, the database 146 may include user identities, account numbers, login credentials, and the like to allow a user to login to her account via the network 160. While the web server 140 is described as a web server that includes a help center application 142, one skill in the art in possession of the present disclosure would recognize that the web server 140 may be a server for a first service provider that provides a first application.

The search engine server 150 may be associated with an entity providing a search engine application 152. An example of the search engine application is the Google™ search engine provided by Google LLC. However, the scope of embodiments is not limited to any particular search engine, as any search engine now known or later developed may interface with the web server 140 as described further below. The search engine application 152 provides a search engine GUI, which may be accessed by the user 105 over the network 160 to perform web searching and, as explained further below, requesting access to sensitive information maintained by the web server 140. While the search engine server 150 is described as a search engine server that includes a search engine application 152, one skill in the art in possession of the present disclosure would recognize that the search engine server 150 may be a second service provider that provides a second application.

The authentication server 180 may be associated with an entity providing an authentication service. An example of an authentication service is LexisNexis™ Risk Solutions provided by LexisNexis™, Inc. However, the scope of embodiments is not limited to any particular authentication service, as any authentication service now known or later developed may interface with the web server 140 as described further below. The authentication service may be provided by a knowledge based authentication (KBA) application 182 that may provide KBA security challenges for authenticating the user 105 at the web server 140 and as explained further below. While the authentication server 180 is described as providing an authentication service, one of skill in the art in possession of the present disclosure would recognize that the authentication server 180 may be a third service provider that provides a third application that may interact with the first application and/or the second application during an application interaction session.

In various embodiments, the call center server 170 may be provided in one call center or more than one call center. The call center may also include one or more physical facilities or virtual facilities for human attendance, such as a support terminal 174 for a support representative. The call center server 170 may also include an IVR application 172 which may run upon one or more of the servers provided by the call center server 170. The IVR application 172 may interface with the user 105 in a call-based communication session. For instance, IVR application 172 may include a machine that provides pre-scripted dialogue to the user 105 to solicit input from the user 105. The user 105 may provide input to IVR application 172 by speaking, by pressing telephone keys to create tones, or the like. In an example in which the web server 140 and the call center 170 are both associated with a service provider, the various techniques described herein may perform user authentication by the help center application 142 and then transfer the user 105 to either the IVR application 172 or the support terminal 174 used by the support representative as appropriate. In a service provider example, the IVR application 172 may solicit input from the user 105 to determine an account number associated with the user 105 or other information. In some instances, the user 105 may be serviced by IVR application 172, though for more complicated requests or intents, the user 105 may be transferred to the support terminal 174 to be connected with the support representative.

In various embodiments, the networked system 100 includes the token provider server 190. The token provider server 190 may be associated with an entity providing a token engine 192 that is configured to perform the functions of the token provider servers and the token engines herein. For example, the token engine 192 generates tokens, provides tokens, receives tokens, generates master tokens that are associated with child tokens of an application session and/or otherwise determines a scope or parameters of the token. Determining the scope or parameters may include determining identities of applications that are eligible token issuers, a minimum, maximum, or required period of validity for the token, suitable encryption schemes for the token, and/or other factors that would be apparent to one of skill in the art in possession of the present disclosure.

In this example, the token database 194 may be associated with the token provider server or may be implemented at a different server (not shown). In this example, the token database 194 may store tokens (e.g., master tokens and associated child tokens), information associated with each token, authorized application identities, and/or any other information that would be apparent to one of skill in the art in possession of the present disclosure. While the token provider server 190 is described as a token provider server that includes a token engine 192, one of skill in the art in possession of the present disclosure would recognize that the token provider server 190 may be provided by the service provider 135 and/or by one of the service providers in the networked system 100.

The various examples described below provide techniques to allow the user 105 to access her account information, including information the user and/or the account provider considers sensitive, such as account balance, account numbers, user date of birth, answers to security questions, transaction history, portions of the user social security number, password, PIN, username, security codes, and other information that may be used by others to access the user account or impersonate the user. The various examples described below also describe how the application session between the various applications (e.g., the help center application 142, the search engine application 152, the KBA application 182) can share information between each other during the application session by tokenizing information with the token provider server 190 at various application session flows during the application session.

Figure 2:
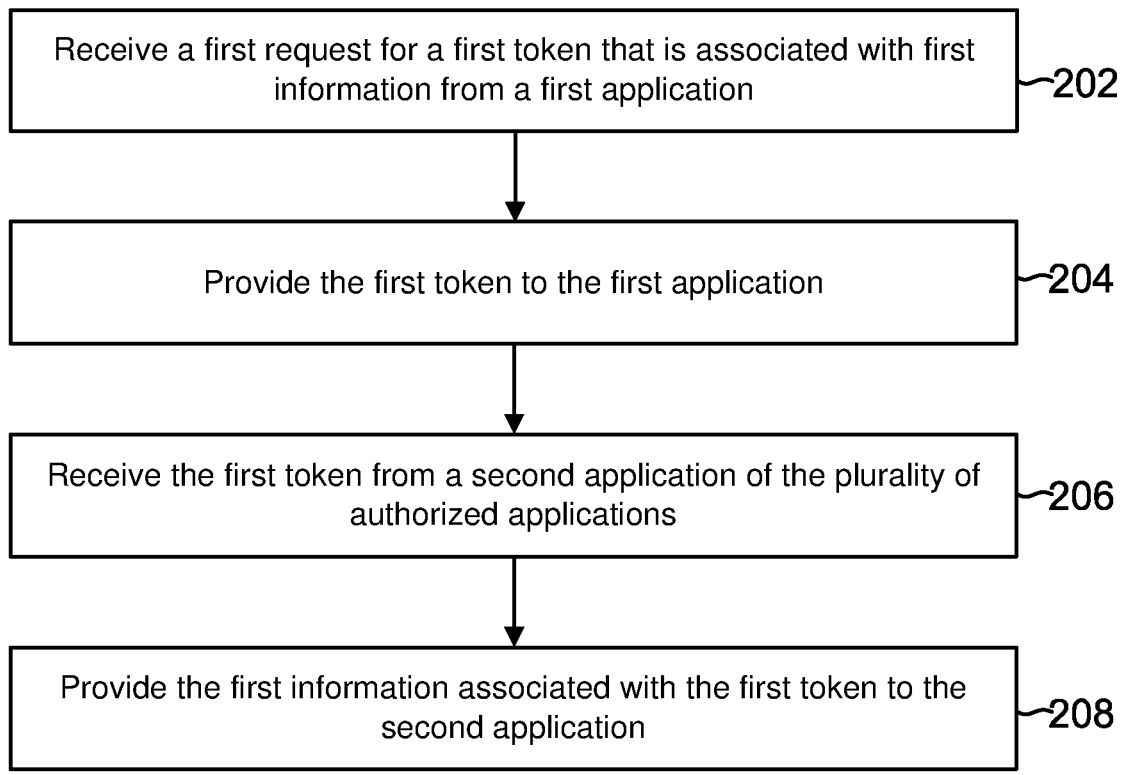
FIG. 2 is a flow diagram of a method of tokenizing an application session between applications, according to an embodiment.

Referring now to FIG. 2, an embodiment of a method 200 for tokenizing an application session is illustrated. The method begins at block 202 where a first request for a first token that is associated with first information is received from a first application, where the application may be web-based or a mobile application. In an embodiment of block 202, the user 105 may initiate an application session at a first application provided by a first service provider. The application session may include one or more application sessions flows that causes the application session to operate between two or more applications such as the first application and a second application. As discussed in examples below, the application session may include the first application and the second application passing information between each other to complete an application session flow (e.g., a step) in the application session. In various embodiments, the information may include sensitive information that requires security due to the nature of the information. Thus, to securely transfer this sensitive information from the first application to the second application, the first application may provide a request to the token provider server 190 to issue a token for the sensitive information. The request may include the first information for the token engine 192 to tokenize the first information; however, it is contemplated that the first information may be already stored in the token database 194. In various embodiments, the first application requesting the token for the first information may be recognized by the token engine 192 as an authorized application such that first application can interact with the token engine 192 in completing the application session.

Figure 3:
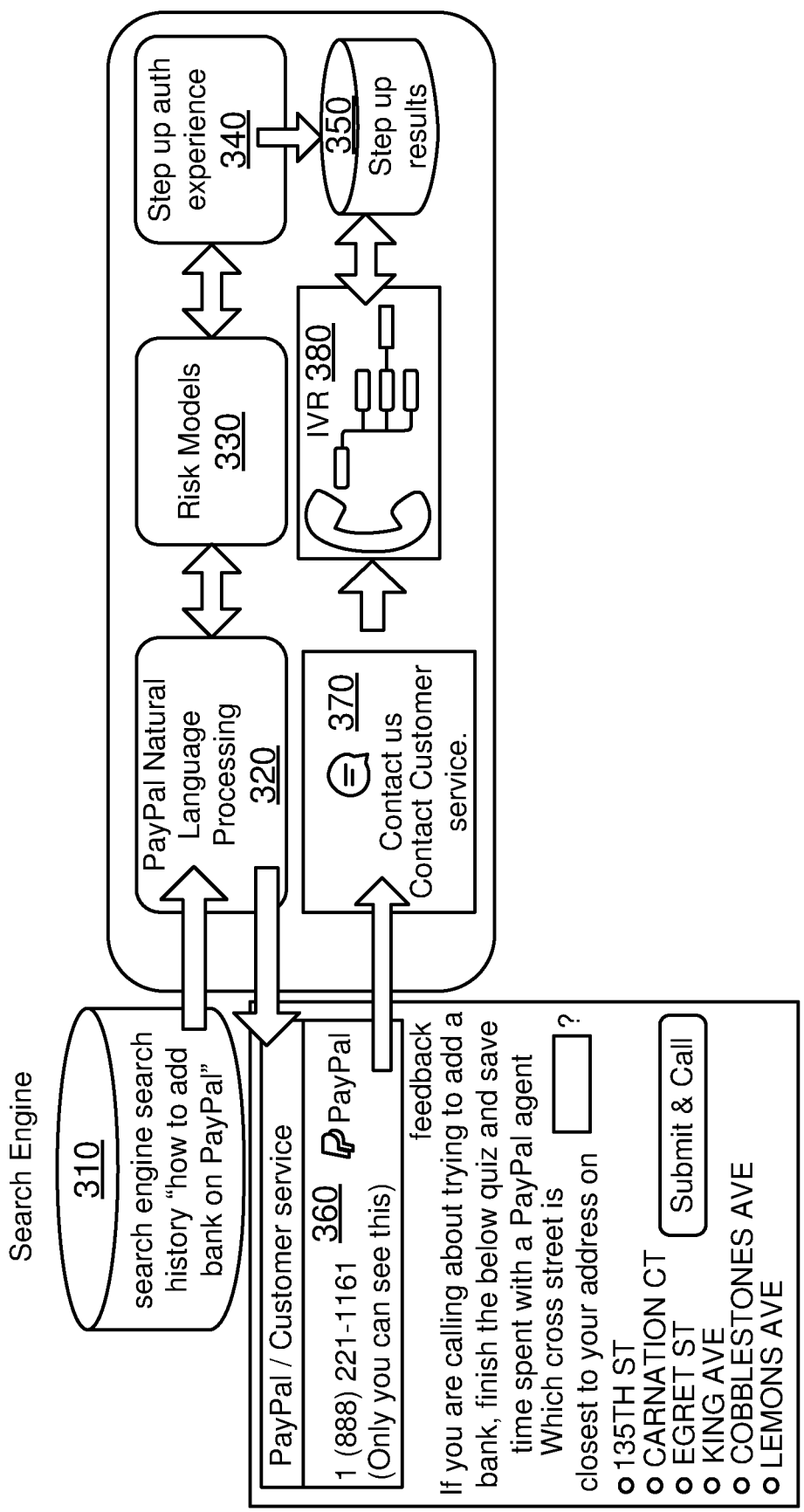
FIG. 3 is an illustration of an example process for authenticating a user, according to one embodiment.
Figure 4:
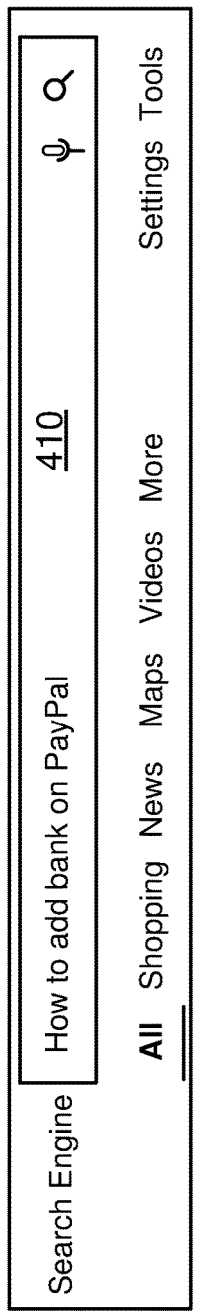
FIG. 4 is an illustration of a graphical user interface (GUI) for authenticating a user, according to the embodiment of FIG. 3.
Figure 4:
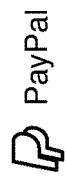

Referring now to FIGS. 3 and 4, an example application session that includes a technique to authenticate a user by using search engine application 152 using tokens is illustrated. In this example, the user 105 is authenticated by a GUI, in this case the GUI of search engine application 152, before being directed to a voice-based communication session with the call center server 170 of the service provider 135.

At action 310 of FIG. 3, the user searches for the term "how to add bank on PayPal". This is further illustrated in FIG. 4, wherein the user 105 types in that particular phrase at search field 410.

The search engine application 152 itself may then use natural language processing (NLP) to ascertain the intent of the user 105 at action 310, or the search engine application 152 may then recognize that the request is for the service provider 135 and send the text string to the service provider 135 (e.g., at web server 140 of FIG. 1) for the web server 140 to perform NLP at action 320. In any event, NLP is used to ascertain that the intent of the user is to link another bank account to a service provider account.

In this particular example, the user 105 is signed into an account associated with the search engine application 152, where the search engine provider of the search engine server 150 and the service provider 135 have a relationship and share some account information. In this case, some search engine accounts are linked to some service provider accounts either at the database 146 of the web server 140 and/or at the database 154 of the search engine server 150.

Figure 5:
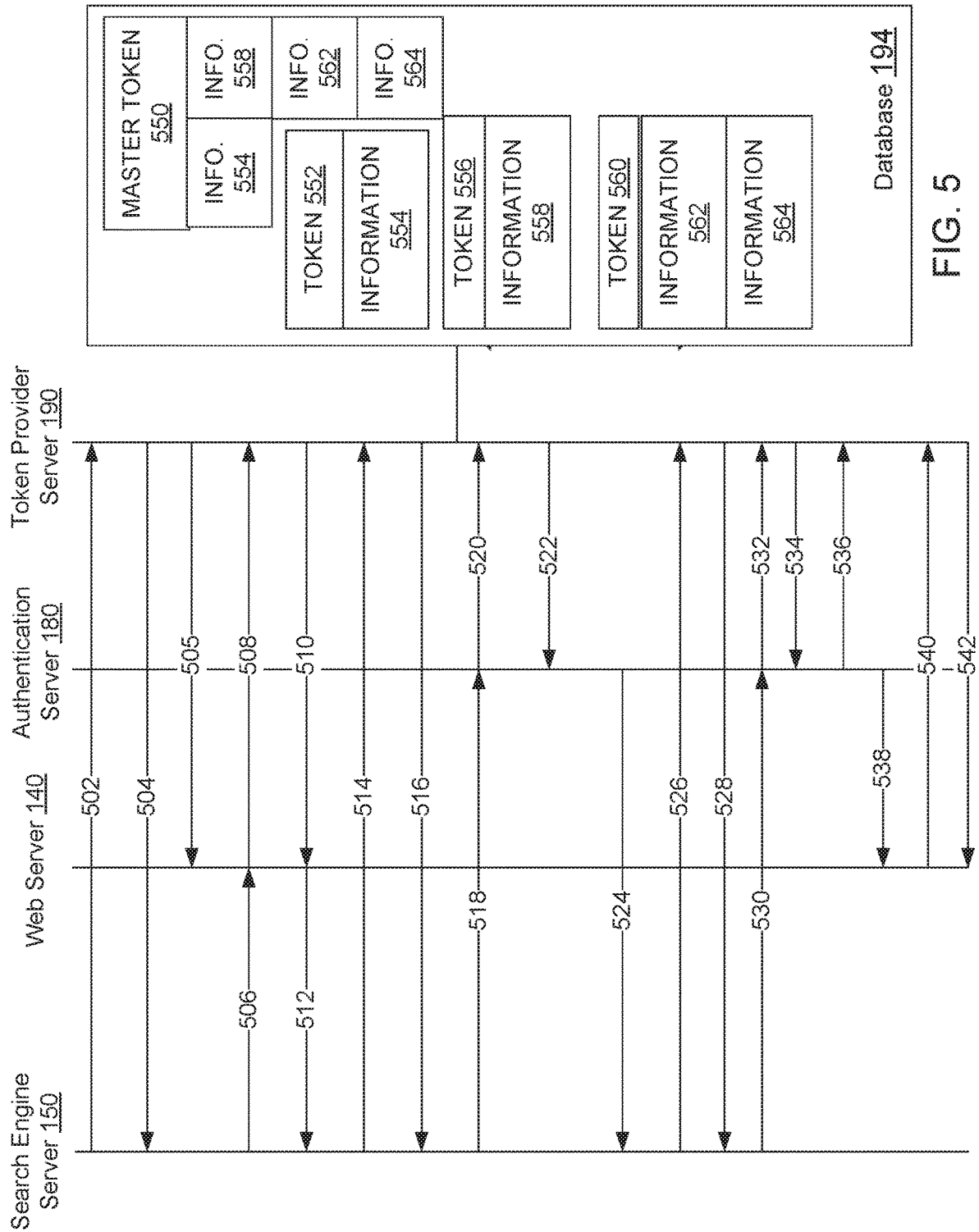
FIG. 5 is a communication diagram using the method of application session tokenization in FIG. 2 during the example authentication process in FIGS. 3 and 4.

Thus, when the search engine application 152 recognizes that the search of the user 105 is going to include interactions with the service provider 135, the search engine application 152 may initiate an application session such that account information may be passed securely between the search engine application 152 and the web server 140. Referring now to FIG. 5, a communication diagram 500 of the application session between the web server 140, the search engine server 150, and the authentication server 180 with the token provider server 190 for the example in FIGS. 3 and 4 that includes the method 200 is illustrated. At block 202 of method 200, the search engine server 150 may provide a first request for a first token that is associated with first information to the token provider server 190 at step 502. The first information may include the search engine account information for the user 105 such as a search engine account identifier.

The method 200 then proceeds to block 204 where a first token is provided to the first application. In an embodiment of block 204, the token engine 192 of the token provider server 190 may provide a token that is associated with the first information to the first application over the network 160. In various embodiments, the token engine 192 may generate a token based on the request and the first information that is provided in the request. In other embodiments, the token may have been previously generated and the request cause the token engine 192 to provide the token associated with the first information. When generating a token, which is a non-sensitive equivalent for the first information (e.g., the first information is not contained within the token), the token engine 192 may associate or map a random number, a random set of characters, and/or other identifier that would be apparent to one of skill in the art to the first information. As such, the token may include the identifier that the token engine 192 assigned to the first information. The token is generated such that it is infeasible to reverse the first information in the absence of the token provider server 190.

In various embodiments, in response to receiving the request, the token engine 192 may determine that the request is included in an application session. For example, the first information, the first application providing the request, the request itself and/or any other condition that would be apparent to one of skill in possession of the present disclosure may indicate that the request from the first application is included in an application session. The token engine 192, in response to determining that the request is included in an application session may generate a master token that the token engine 192 maps to or associates with the first token. As such, the first information is mapped to the master token as well as any other information that is provided in the application session to the token provider server 190. The master token may be provided to an owning application that "owns" or otherwise controls the application session. In various embodiments, the owning application may be the first application, one or more other applications interacting in the application session, and/or an application that is not participating in the application session. The master token may be provided to the owning application anytime during the application session once the token engine 192 has notice of the application session.

Referring back to FIG. 5 that illustrates the communication diagram 500 of the application session with the token provider server 190 during the application session example in FIGS. 3 and 4 during block 204 of method 200, the token provider server 190 may generate a token 552 and associate the information 554 that includes the search engine account information of the user 105. The token provider server 190 may return the token 552 to the search engine server 150 at step 504. The token engine 192 of the token provider server 190 may also generate a master token 550 and associate the information 554 to the master token 550. The token provider server 190 may provide the master token 550 to the web server 140, at step 505, which may include the owning application of the application session that was identified by the token provider server 190 when the request from the search engine server 150 was received at step 502. The first information may include the search engine account information for the user 105 such as a search engine account identifier.

The method 200 then proceeds to block 206 where the first token is received from a second application by the token provider server. In an embodiment of block 206, the token engine 192 of the token provider server 190 may receive the first token over the network 160 from a second application. The receiving of the first token that indicates a request for the first information that is associated with the first token. As such, the first application may have provided the first token to the second application over the network 160 as part of an application session flow of the application session and the second application may provide the token to the token provider server 190 to retrieve the first information.

Referring back to FIG. 5, at step 506 of the communication diagram 500 illustrating the example application session of FIGS. 3 and 4, the search engine server 150 may provide over the network 160 the token 552 to the web server 140 at step 506. The web server 140 may provide the token 552 to the token provider server 190 at step 508 requesting the information that is associated with the token 552.

The method 200 then proceeds to block 208 where the first information associated with the first token is provided to the second application. In an embodiment of block 208, the token engine 192 may determine that the second application is an authorized application to interact with the token provider server 190. For example, the token engine 192 may receive login credentials or some other authentication identifier that indicates that the second application is authorized to interact with the token engine 192. In other embodiments, the token engine 192 may determine whether the second application is authorized to participate in the application session before redeeming the first token for the first information. Once the second application is authenticated, the token engine 192 may process the first token (including determining the first information from the first token) and provide the first information that is associated with the first token to the second application. The second application may use this first information to perform an action of the application flow for the application session.

Referring again to FIG. 5, at step 510 of the communication diagram 500 illustrating the example application session of FIGS. 3 and 4, the token provider server 190 may provide over the network 160 the information 554 that is associated with the token 552 to the web server 140. The web server 140 may use the information 554 to perform an action of the application session. For example, and referring to the example application session in FIGS. 3 and 4, by providing the token 552 to the web server 140 that is associated with the search engine account credentials (e.g., information 554), the search engine server 150 essentially provides search engine account credentials and/or the service provider server account credentials to the web server 140, so that the web server 140 has account credentials that it can link to a particular service provider account along with a user intent. The help center application 142 at the web server 140 then runs risk models at action 330 to determine particular security policies associated with that intent. Based on the risk models, the help center application 142 may determine that a step-up authentication challenge is needed as discussed in more detail below. Otherwise, in other embodiments the use of the search engine account credentials may be enough to satisfy the risk model and the method 200 may end.

In various embodiments of the method 200, the token engine 192 of the token provider server 190 may receive subsequent requests from the first application, the second application, and/or any other application that is participating in the application session for tokens (e.g., requests to tokenize information), and receive those tokens from the first application, the second application, and/or any other application that is participating in the application session to return the information associated with the tokens to the application that provided the token to the token engine 192. In an embodiment, the second application may perform the action associated with the first information and send a request that is received by the token provider server 190 to provide a second token that is associated with second information. For example, the second application may request the second token that is associated with second information, which in some embodiments may be the first token. In other embodiments, the request may include second information and a request to tokenize the second information. The token engine 192 may generate a second token and associate the second token with the second information. The token engine 192 may associate the second token with second information and provide the second token to the second application. The token engine 192 may associate the second token and/or the second information associated with the second token to the master token. The token engine 192 may subsequently receive the second token from the first application and/or a third application that is included in the application session as part of an application session flow. The token engine 192 may provide the second information to the application that provided the second token. The application that receives the second information may perform some action of an application session flow of the application session with the second information.

In various embodiments, some application session flows of the application session may include an application of the application session flow adding information to a token. For example, instead of generating a second token for the second information, the second application may request that the second information be associated with the first token. As such, the second application can communicate with the first application to notify the first application to use the first token to access the second information to perform an action of an application session flow of the application session. In other embodiments, a third application may provide the request for the second token that is associated with second information. The application session may advance to an application session flow that involves the third application and the third application, as part of the application flow, may request the second token that includes the second information. For example, the second information may include information generated by the third application during an application session flow of the application session that needs to be provided securely back to the first application and/or the second application to complete the application session.

Referring back to the example application session illustrated by FIGS. 3, 4, and 5, the help center application 142, in response to the policy at action 330, identifies that a step-up authentication challenge is required to authenticate the user 105. At step 512, the web server 140 provides a request to the search engine server 150 to provide to the user 105 a step-up authentication challenge and/or any other authentication technique that would be apparent to one of skill in the art in possession of the present disclosure, the type of step-up authentication challenge (e.g., a KBA), and/or any other information/instructions that may be apparent to one of skill in the art in possession of the present disclosure. In some examples, the request at step 512 includes the token 552.

In response to receiving the response during step 512, the search engine server 150 may process the request to obtain the type of step-up authentication to present to the user 105. The search engine server 150, at step 514, may provide a request to the token provider server 190 to tokenize a user identifier such as a name, a phone number, a social security number, and/or any other identifier of the user 105 that is associated with the search engine user credentials of the user 105. The token provider server 190 may generate a token 556 that associates information 558 with the token 556. The information 558 is also associated with the master token 550. At step 516, the token provider server 190 provides the token 556 to the search engine server 150 over the network 160. Then, at step 518, the search engine server 150 provides the token 556 to the authentication server 180. At step 520, the authentication server 180 provides the token to the token provider server 190. The token provider, at step 522, returns the information 558 to the authentication server 180.

The authentication server 180 uses the user identifier from the information 558 to authenticate the user. For example, the help center application 142 may have requested a knowledge based authentication (KBA) to further authenticate the user. As such, the KBA application 182 of the authentication server 180 may use the user identifier associated with the search engine credentials to gather information about the user associated with the user identifier from database 184 and formulate a step-up authentication challenge (e.g., a KBA challenge).

Continuing with this example, FIG. 6 shows a particular instance of a KBA that asks the user 105 to select information that the user associated with user identifier would be expected to know but an attacker who does not know the user would not be expected to know. For example, the user 105 may be asked to answer a geographic question regarding streets near her home. Note that in this example, user account information stored in database 184 may include a variety of different user identifying information (e.g., a user's home address) that can be utilized during authentication. The scope of embodiments is not limited to any particular type of user identifying information including a home address, as other user identifying information may be stored and utilized, such as a user's phone number, personal questions such as high school attendance, car color, and the like.

Returning to communication diagram 500 of FIG. 5, at step 524, the authentication server 180 provides the step-up authentication challenge to the search engine server 150 for the search engine server 150 to render in its GUI of the search engine application 152. This is shown at action 360 of FIG. 3 and at item 430 of FIG. 4. FIG. 4 shows interactive web objects that may be presented on the GUI of search engine application 152 in this embodiment. Item 420 is a search result that is presented to the user as an alternative to authentication using interactive item 430. Interactive item 430 includes the authentication challenge that was passed from the authentication server 180 to the search engine application 152 at action 360 and step 524. In this example, the user may select an appropriate answer from the list of appropriate answers and then select "submit and call" to authenticate using the challenge.

The search engine server 150 provides a request to the token provider server 190 to return a token for the answer to the authentication challenge at step 526. The token engine 192 generates token 560 and associates the token 560 with the answer to the authentication challenge as information 562. The token engine 192 also associates information 562 to the master token 550. At step 528, the token engine 192 provides the token 560 to the search engine server 150. At step 530, the search engine server 150 provides the token 560 to the authentication server 180 and at step 532, the authentication server 180 provides the token 560 with a request for the information 562 to the token provider server 190. At step 534, the token provider server 190 may provide the information 562 that includes the answer to the step-up authentication challenge provided by the user 105. The KBA application 182 may process the answer to determine whether the user 105 passed or failed the knowledge base security question. In various examples, the KBA application 182 may determine an indeterminate result. For example, if the KBA application 182 does not receive an answer after a predetermined condition such as a predetermined time, the KBA application 182 may return an indeterminate result indicating that the step-up authentication challenge was abandoned.

In various examples, in response to determining the result of the security question, the KBA application 182 may store the result (e.g., pass, fail, or abandoned) of the step-up authentication challenge against the token 560 at step 536. The token provider server 190 may receive the result of the step-up authentication challenge and associate the result with the token 560 as information 564. The information 564 may also be associated with the master token 550. In various embodiments, the authentication server 180 may provide the token 560 to the web server 140, at step 538, so that the web server 140 may use the token 560 to obtain the results to the step-up authentication challenge from the token provider server 190, at step 540 and step 542.

In various embodiments of method 200, the token engine 192 may receive the master token from the owning application that controls the application session. In various embodiments, the owning application may be the first application and/or the second application. In response to receiving the master token, the token engine 192 may provide to the owning application all information that is associated with tokens that are associated with the master token for the particular application session. As such, the owning application may retrieve the full details of the application session including all of the application flows that occurred with the token provider server.

Referring to the communication diagram 500 of FIG. 5, the authentication server 180 may notify web server 140, at step 538, that the step-up authentication challenge has been satisfied. The web server 140, being the owning application of the application session, may present the master token 550 to the token provider server 190, at step 540. The token provider server 190 may then process the received master token 550 and provide the information 554, 558, 562, and/or 564 or some portion of the information 554, 558, 562, and/or 564 to the web server 140 such that the web server 140 receives the step-up authentication challenge result, at step 542.

Assuming that the user 105 is properly authenticated at action 360, the web server 140 stores the authentication results in intermediate storage 144 at action 350. In some of the examples, the "submit and call" link automatically connects the user 105 to the call center server 170 in a voice-based communication. In other examples, the user 105 may then be prompted to call the call center server 170 using the customer service number shown in web result 320, or is prompted at action 370. In any event, the user begins a voice-based communication session with IVR application 172 at action 380. Once again, the IVR application 172 accesses the result of the authentication from the intermediate storage 144 and, assuming that the account matches and the user 105 is authenticated, continues to process the user's intent. Furthermore, such example may include assisting the user 105 by chat or other textual technique instead of or in addition to the voice-based communication session.

FIG. 4 shows interactive web objects that may be presented on the GUI of search engine application 152 in this embodiment. Item 420 is a search result that is presented to the user as an alternative to authentication using interactive item 430. Interactive item 430 includes the step-up authentication challenge that was passed from KBA application 182 to the search engine application 152 at action 360. In this example, the user 105 may select an appropriate answer from the list of appropriate answers and then select "submit and call" to authenticate using the challenge.

Figure 7:
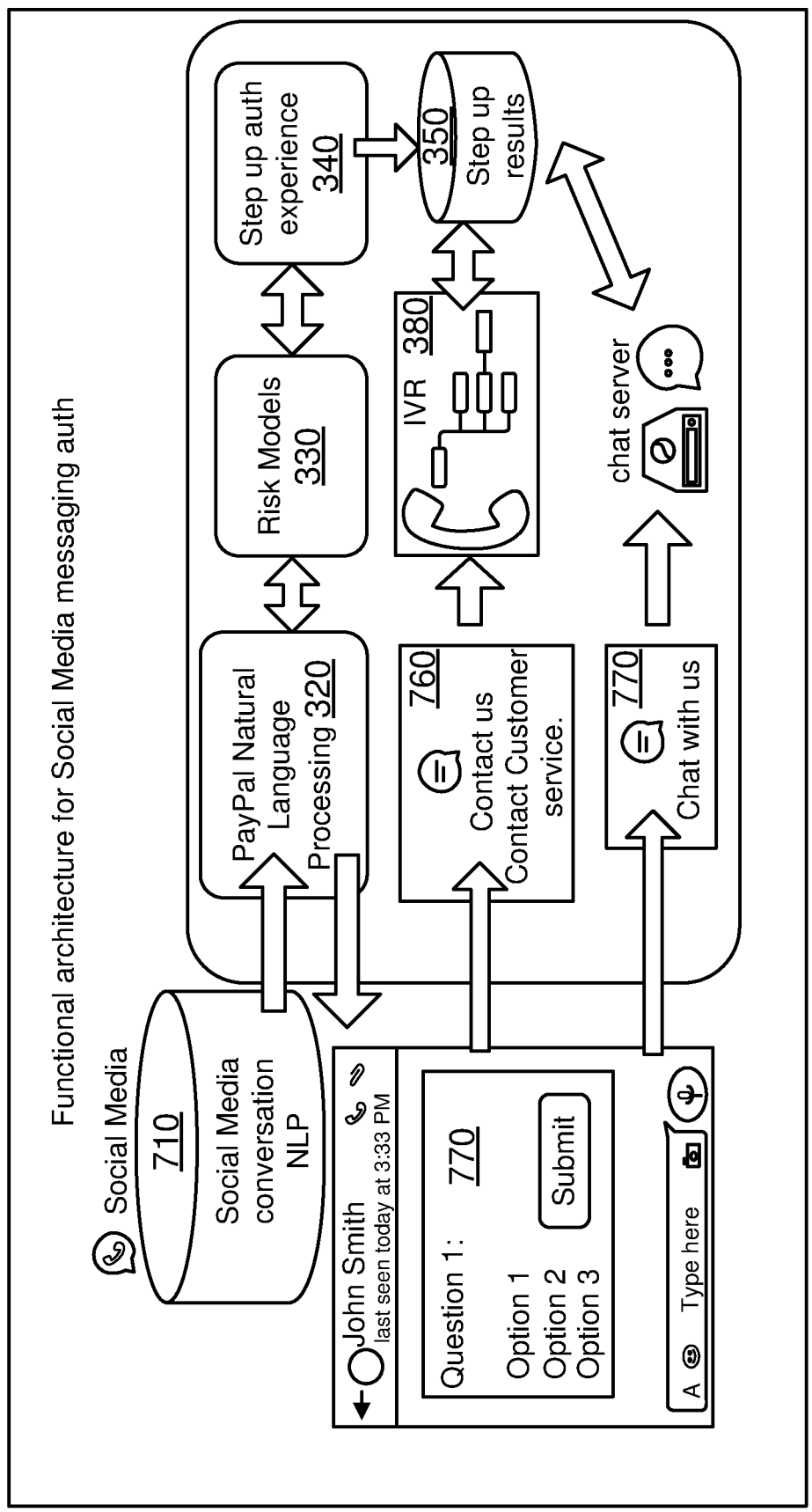
FIG. 7 is an illustration of an example process for authenticating a user, according to one embodiment.
Figure 8:
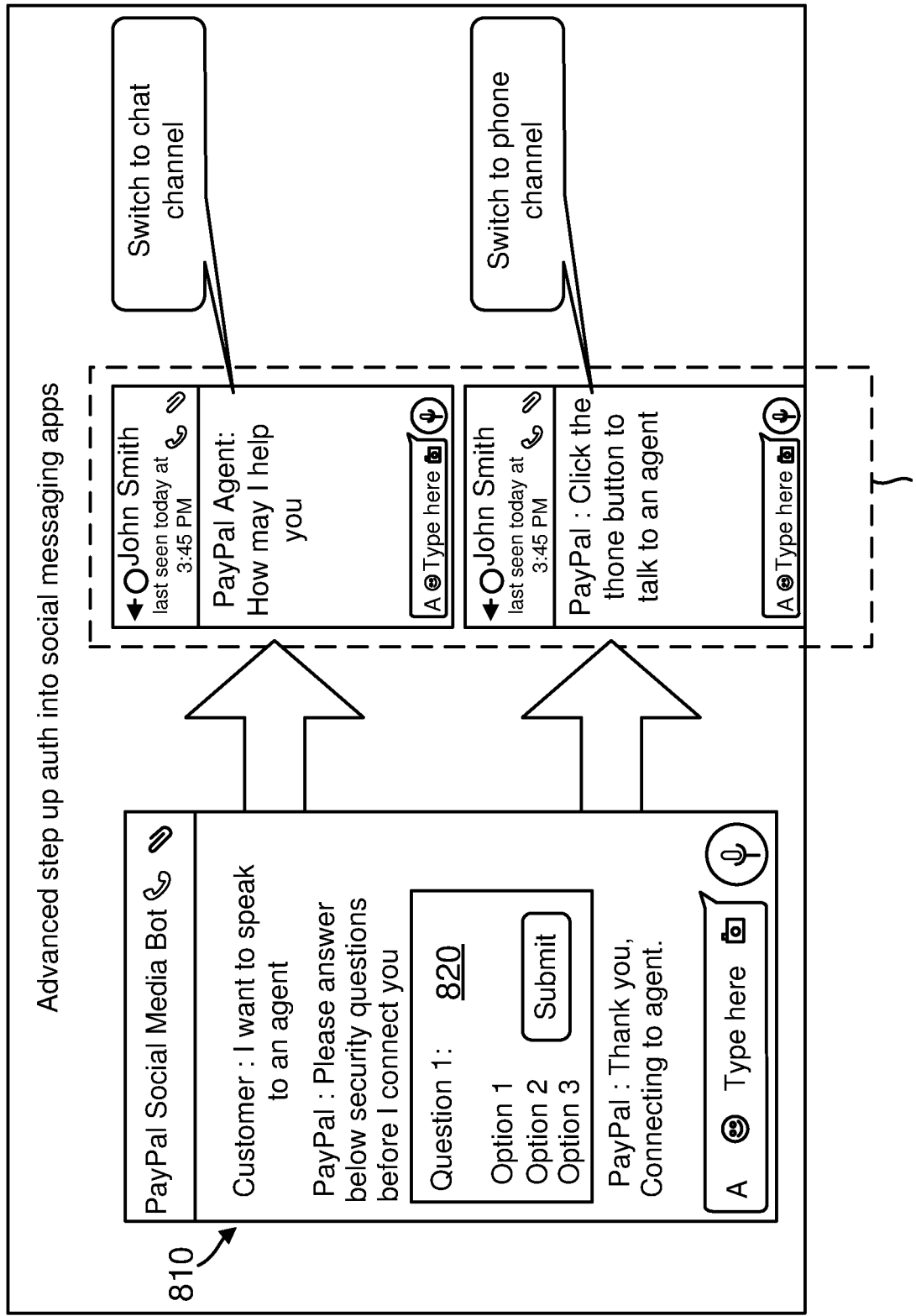
FIG. 8 is an illustration of a GUI for authenticating a user, according to one embodiment.

FIGS. 7 and 8 illustrate an example technique to authenticate a user by using a social media helper bot application, according to one embodiment. The example of FIGS. 7 and 8 is similar to the search engine entry point example of FIGS. 3 and 4. However, in the example of FIGS. 7 and 8, a social media helper bot may determine whether to use step-up authentication based on NLP analysis performed on the user's input. The social media helper bot may then administer the authentication challenges, save the authentication result and other information to intermediate storage, and handoff the interaction to a phone or chat agent. The phone or chat agent may then access the information from intermediate storage to consume the output of the authentication, as in the examples above.

In this example, as in the examples described above, the user 105 is authenticated by a GUI, in this case the GUI of helper bot application, before being directed to a voice-based communication session.

The example of FIGS. 7 and 8 is similar to the example of FIGS. 3 and 4 and in fact same or similar actions 320, 330, 340, 350 are present in both examples. At action 710, the user 105 is logged into the social media platform associated with a social media server in place of the search engine server 180 and sends a message to a social media helper bot application. For instance, the user may send a message such as, "how to add bank on PayPal." The social media server itself may then use NLP to ascertain the user's intent at action 710, or the social media server may recognize that the request is for a service provider and in response transmit the text string to the web server 140 for the web server 140 to perform NLP to ascertain the user intent.

In one use case, the user 105 is signed into an account associated with the social media server, and the social media server and the service provider may have a relationship to share account information credentials. In this use case, some social media accounts are linked to some service provider accounts either at database 146, at a database associated with the social media server, or at both. Using a similar tokenization scheme to that of the communication diagram 500 of FIG. 5, the social media server provides the social media account credentials and/or the service provider server account credentials to the web server 140 so that the web server 140 can then identify a particular service provider account along with a user intent. The help center application 142 then runs risk models, identifies particular authentication policies, identifies particular authentication challenges, and causes a particular authentication challenge to be presented from the authentication server 180 to the social media server at actions 330-340 using the application session tokenization described above.

The social media server may then render the step-up authentication challenge in its GUI at action 760. The user 105 may provide an answer to the challenge and click "submit." The social media helper bot application transmits the result, via the authentication serve 180, to the help center application 142, which stores the authentication result in intermediate storage 144 at action 350. The social media helper bot application may then prompt the user to begin a voice-based communication session with the IVR application 172 at action 770. After the user contacts the IVR application 172, the IVR application 172 identifies the user account, searches the intermediate storage 144 for authentication results corresponding to that user account, and (assuming the user has passed, and the intent is still the same) services the user intent at action 380.

In this example, action 770 may also include presenting a chat server option to the user instead of or in addition to the voice-based communication session.

Looking to FIG. 8, the use case is slightly different from that shown in FIG. 7. In example of FIG. 8, the user 105 simply asks to speak to an agent via GUI 810. In response to the request to speak to the agent, the social media helper bot proceeds with actions 320-340 to present an appropriate step up authentication challenge 820 at GUI 810. Assuming that the user 105 attempts the challenge, then the results are saved to intermediate storage action 350, and the user is then prompted at action 830 to either chat or begin a voice-based communication session.

Thus, systems and methods have been described that tokenize an application session between at least two applications. In various embodiments of the present disclosure, each application session flow of the application session is protected using tokenization where the first application retrieves a token issued by a token provider/vault. The token itself is associated with information at the token provider. The first application then provides the token to the second application. The second application presents the token to the token provider and exchanges it for the information associated with the token. The token provider maintains the secure information mapped to the token. The owner of the overall application session is offered a master token upon session initiation or at any time during the application session. At end of the application session or as part of an application session flow, the session owning application uses the master token to retrieve all application session details from token provider/vault that is mapped to the various tokens of the session. As such, the embodiments described in the present disclosure improve application session security between two or more applications passing sensitive information between each other. Furthermore, the systems and methods allow an owning application to access the information associated with the tokens of the applications using the master token which decreases the amount of network resources and processing resources needed to provide each token of each application session flow to the owning application over a network. Thus, the systems and methods improve security of computer related technology and the efficiency of the computer related technology as well as other improvements that would be apparent to one of skill in the art in possession of the present disclosure.

Figure 9:
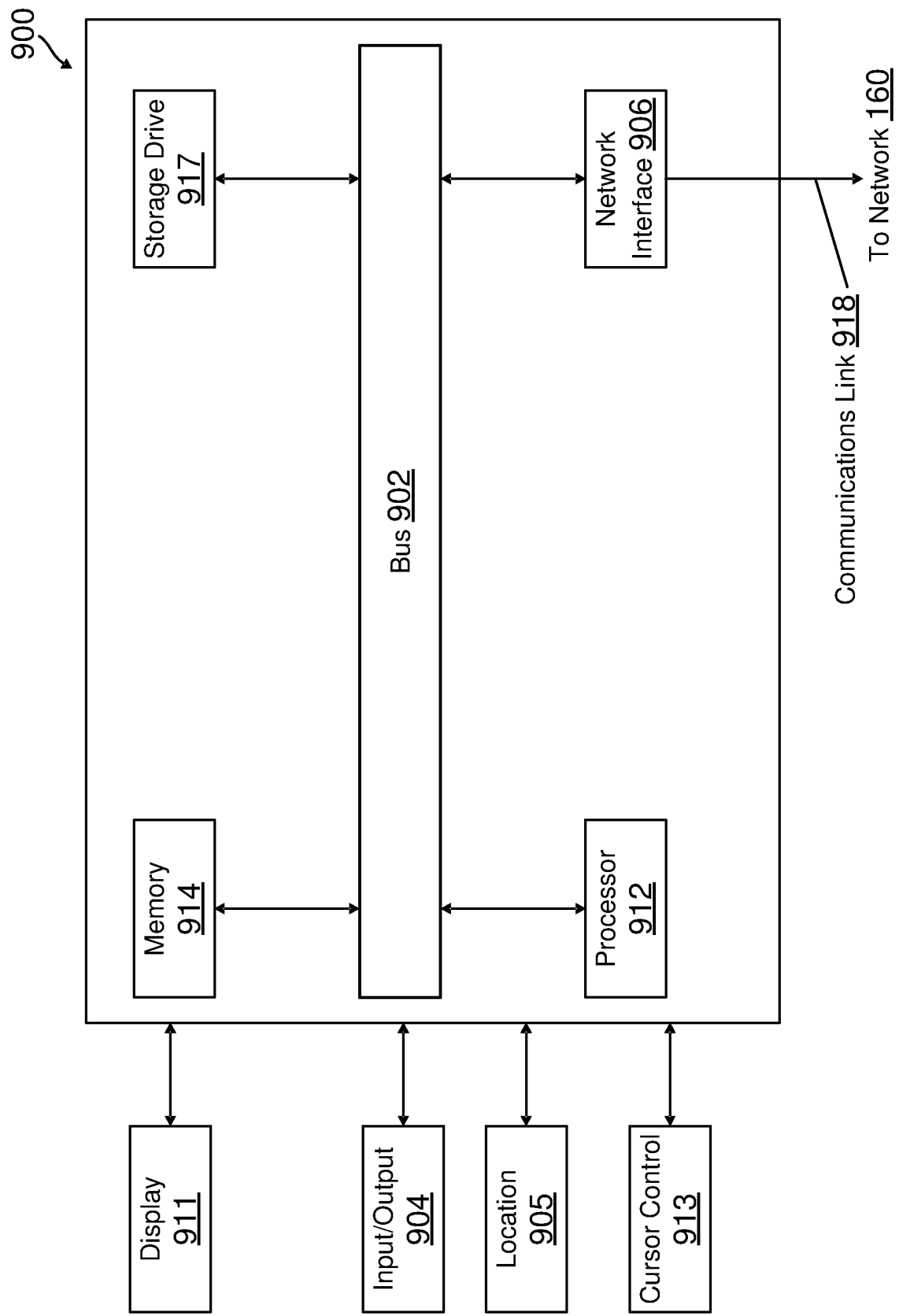
FIG. 9 is a block diagram of a computer system suitable for implementing one or more components in FIG. 1 according to one embodiment.

FIG. 9, an embodiment of a computer system 900 suitable for implementing, for example, the computing devices 110, 140, 150, 180, 190 and any servers of call center server 170 of FIG. 1 discussed above. It should be appreciated that other devices utilized in the system discussed above may be implemented as the computer system 900 in a manner as follows.

In accordance with various embodiments of the present disclosure, computer system 900, such as a smart phone, computer, and/or a network server, includes a bus 902 or other communication mechanism for communicating information, which interconnects subsystems and components, such as a processing component 912 (e.g., processor, microcontroller, digital signal processor (DSP), etc.), a system memory component 914 (e.g., RAM) a storage drive component 917 (e.g., solid-state, hard drive, or optical), a network interface component 906 (e.g., wireless card, modem, or Ethernet card), a display component 911 (e.g., a touchscreen, CRT, or LCD), an input/output component 904 (e.g., keyboard, keypad, a touchscreen), a cursor control component 913 (e.g., mouse, pointer, or trackball), and/or a location determination component 905 (e.g., a Global Positioning System (GPS) device as illustrated, a cell tower triangulation device, and/or a variety of other location determination devices known in the art). In one implementation, the storage drive component 917 may comprise a database having one or more storage drive components.

In accordance with embodiments of the present disclosure, the computer system 900 performs specific operations by the processor 912 executing one or more sequences of instructions contained in the memory component 914, such as described herein with respect to FIGS. 1-8 discussed above. Such instructions may be read into the system memory component 914 from another computer readable medium, such as storage drive 917. In other embodiments, hard-wired circuitry may be used in place of or in combination with software instructions to implement the present disclosure.

Logic may be encoded in a computer readable medium, which may refer to any tangible and non-transitory medium that participates in providing instructions to the processor 912 for execution. Such a medium may take many forms, including but not limited to, non-volatile media and volatile media. In various implementations, non-volatile media includes hard drive or solid-state drives, such as the storage drive component 917, and volatile media includes dynamic memory, such as the system memory component 914. Some common forms of computer readable media includes, for example, floppy disk, flexible disk, hard disk, magnetic tape, any other magnetic medium, CD-ROM, DVR, any other optical medium, punch cards, paper tape, any other physical medium with patterns of holes, RAM, PROM, EPROM, FLASH-EPROM, any other memory chip or cartridge, or any other medium from which a computer is adapted to read.

In various embodiments of the present disclosure, execution of instruction sequences to practice the present disclosure may be performed by the computer system 900. In various other embodiments of the present disclosure, a plurality of the computer systems 900 coupled by a communication link 918 to the network 160 (e.g., such as a LAN, WLAN, PTSN, and/or various other wired or wireless networks, including telecommunications, mobile, and cellular phone networks) may perform instruction sequences to practice the present disclosure in coordination with one another.

The computer system 900 may transmit and receive messages, data, information and instructions, including one or more programs (i.e., application code) through the communication link 918 and the network interface component 906. The network interface component 906 may include an antenna, either separate or integrated, to enable transmission and reception via the communication link 918 to network 160. Received program code may be executed by processor 912 as received and/or stored in storage drive component 917 or some other non-volatile storage component for execution.

The present disclosure may be implemented using hardware, software, or combinations of hardware and software. Also, where applicable, the various hardware components and/or software components set forth herein may be combined into composite components comprising software, hardware, and/or both without departing from the scope of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure.

Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A system, comprising:
   a non-transitory memory; and

17 one or more hardware processors coupled to the non-transitory memory and configured to read instructions from the non-transitory memory to cause the system to perform operations comprising:
  receiving, from a first application, a first request for a first token that is associated with first information, wherein the first request for the first token is part of an application session between a plurality of applications that includes the first application;
  providing a master token to an owning application of the plurality of applications after the receiving the first request for the first token, wherein the owning application controls the application session and the master token is mapped to the first token;
  associating the first information with the master token;
  maintaining an association of the first token with the first information such that none of the plurality of applications is able to reverse the first token to obtain the first information without the association;
  providing the first token to the first application;
  receiving the first token from a second application of the plurality of applications;
  determining, in response to receiving the first token, the first information from the association of the first token with the first information; and
  providing the first information to the second application, wherein the first information enables an action to be performed by the second application based on the first information.

2. The system of claim 1, wherein the first token is received from the second application via the first application.

3. The system of claim 1, wherein the operations further comprise:
  receiving the master token from the owning application; and
  providing the first information to the owning application.

4. The system of claim 1, wherein the owning application is the second application.

5. The system of claim 1, wherein the operations further comprise:
  receiving a second request from the second application for a second token that is associated with second information;
  providing the second token to the second application;
  receiving the second token from a third application;
  determining the second information from the second token; and
  providing the second information to the third application.

6. The system of claim 5, wherein the operations further comprise:
  associating the second information with the master token;
  receiving the master token from the owning application; and
  providing the first information and the second information to the owning application.

7. The system of claim 5, wherein the third application is the first application.

8. A method of application session tokenization, comprising:
  receiving, by a token provider server and from a first application, a first request for a first token that is associated with first information, wherein the first request for the first token is part of an application session between a plurality of applications that includes the first application;

18 providing, by the token provider server, a master token to an owning application of the plurality of applications after the receiving the first request for the first token, wherein the owning application controls the application session and the master token is mapped to the first token;
  associating, by the token provider server, the first information with the master token;
  maintaining, by the token provider server, an association of the first token with the first information such that none of the plurality of applications is able to reverse the first token to obtain the first information without the association;
  providing, by the token provider server, the first token to the first application;
  receiving, by the token provider server, the first token from a second application of the plurality of applications;
  accessing, in response to receiving the first token, the first information associated with the first token via the association; and
  providing, by the token provider server, the first information to the second application, wherein the first information enables an action to be performed by the second application based on the first information.

9. The method of claim 8, wherein the first token is received from the second application via the first application.

10. The method of claim 8, further comprising:
  receiving, by the token provider server, the master token from the owning application; and
  providing, by the token provider server, the first information to the owning application.

11. The method of claim 8, wherein the owning application is the second application.

12. The method of claim 8, further comprising:
  receiving, by the token provider server, a second request from the second application for a second token that is associated with second information;
  providing, by the token provider server, the second token to the second application;
  receiving, by the token provider server, the second token from a third application; and
  providing, by the token provider server, the second information to the third application.

13. The method of claim 12, further comprising:
  associating, by the token provider server, the second information with the master token;
  receiving, by the token provider server, the master token from the owning application; and
  providing, by the token provider server, the first information and the second information to the owning application.

14. A non-transitory machine-readable medium having stored thereon machine-readable instructions executable to cause a machine to perform operations comprising:
  receiving, from a first application, a first request for a first token that is associated with first information, wherein the first request for the first token is part of an application session between a plurality of applications that includes the first application;
  providing a master token to an owning application of the plurality of applications after the receiving the first request for the first token, wherein the owning application controls the application session and the master token is associated with the first token;
  associating the first information with the master token;

maintaining an association of the first token with the first information such that none of the plurality of applications is able to reverse the first token to obtain the first information without the association;

providing the first token to the first application;

receiving the first token from a second application of the plurality of applications;

accessing, in response to receiving the first token, the first information associated with the first token via the association; and providing the first information associated with the first token to the second application, wherein the first information enables an action to be performed by the second application based on the first information.

15. The non-transitory machine-readable medium of claim 14, wherein the operations further comprise:

receiving the master token from the owning application; and providing the first information to the owning application.

16. The non-transitory machine-readable medium of claim 14, wherein the operations further comprise:

receiving a second request from the second application for a second token that is associated with second information;

providing the second token to the second application;

receiving the second token from a third application; and providing the second information to the third application.

17. The non-transitory machine-readable medium of claim 16, wherein the operations further comprise:

associating the second information with the master token;

receiving the master token from the owning application; and providing the first information and the second information to the owning application.

* * * * *